March 22, 1932.　　J. W. GOBLE　　1,850,500
MILK COOLER
Filed May 4, 1931　　2 Sheets-Sheet 1

Inventor
John W. Goble.
By
Eccleston & Eccleston
Attorneys

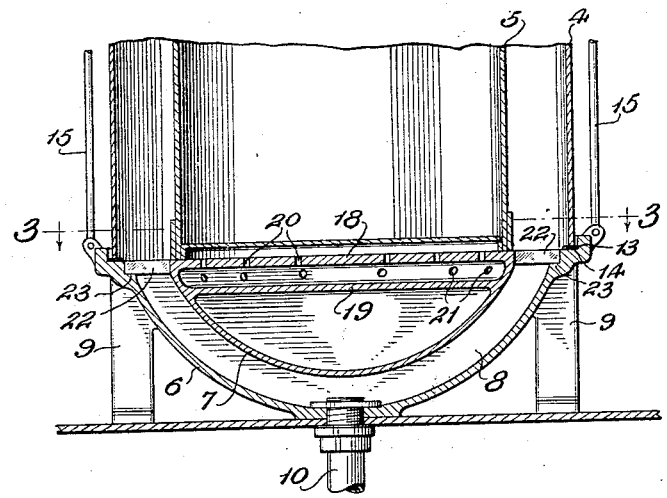
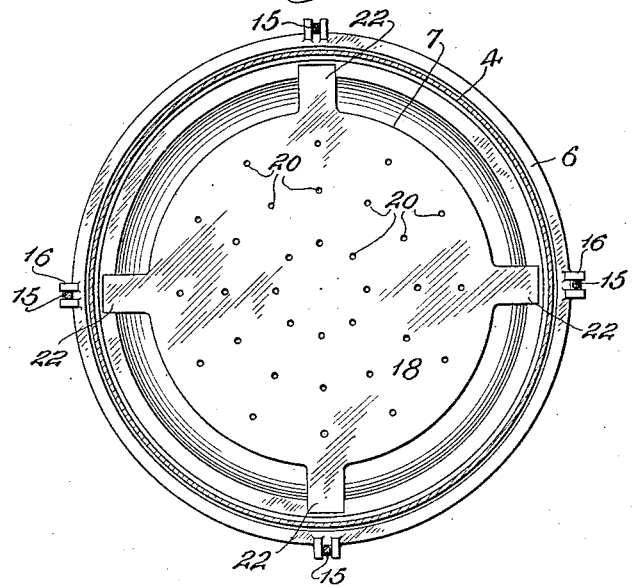

Patented Mar. 22, 1932

1,850,500

UNITED STATES PATENT OFFICE

JOHN W. GOBLE, OF GOSPORT, INDIANA

MILK COOLER

Application filed May 4, 1931. Serial No. 534,992.

This invention relates to coolers in general, but more especially to milk coolers and has for its primary object to provide a simplified and efficient apparatus for carrying off the animal heat of the milk as well as to maintain the milk at a relatively low temperature during hot weather.

Another object of the invention resides in the provision of a milk cooler adapted to receive one or more conventional milk cans, as may be desired, and circulate a cooling fluid around the same in such manner as to carry off the maximum amount of heat per unit of cooling fluid.

A further object of the invention consists in the use of a water spreader which serves to direct the cooling fluid to all parts of the exterior wall of the milk can, thereby not only reducing the time required in the cooling operation, but also greatly increasing the efficiency of the apparatus.

Other objects and advantages of the apparatus will be apparent from the following description when taken in connection with the accompanying drawings, in which Figure 1 is a vertical sectional view through the novel cooler, showing two cooling units in use.

Figure 2 is an enlarged fragmentary sectional view through one of the cooling units.

Figure 3 is a horizontal sectional view taken on line 3—3 of Figure 2, looking in the direction of the arrows, the milk can being removed.

Figures 1, 4:
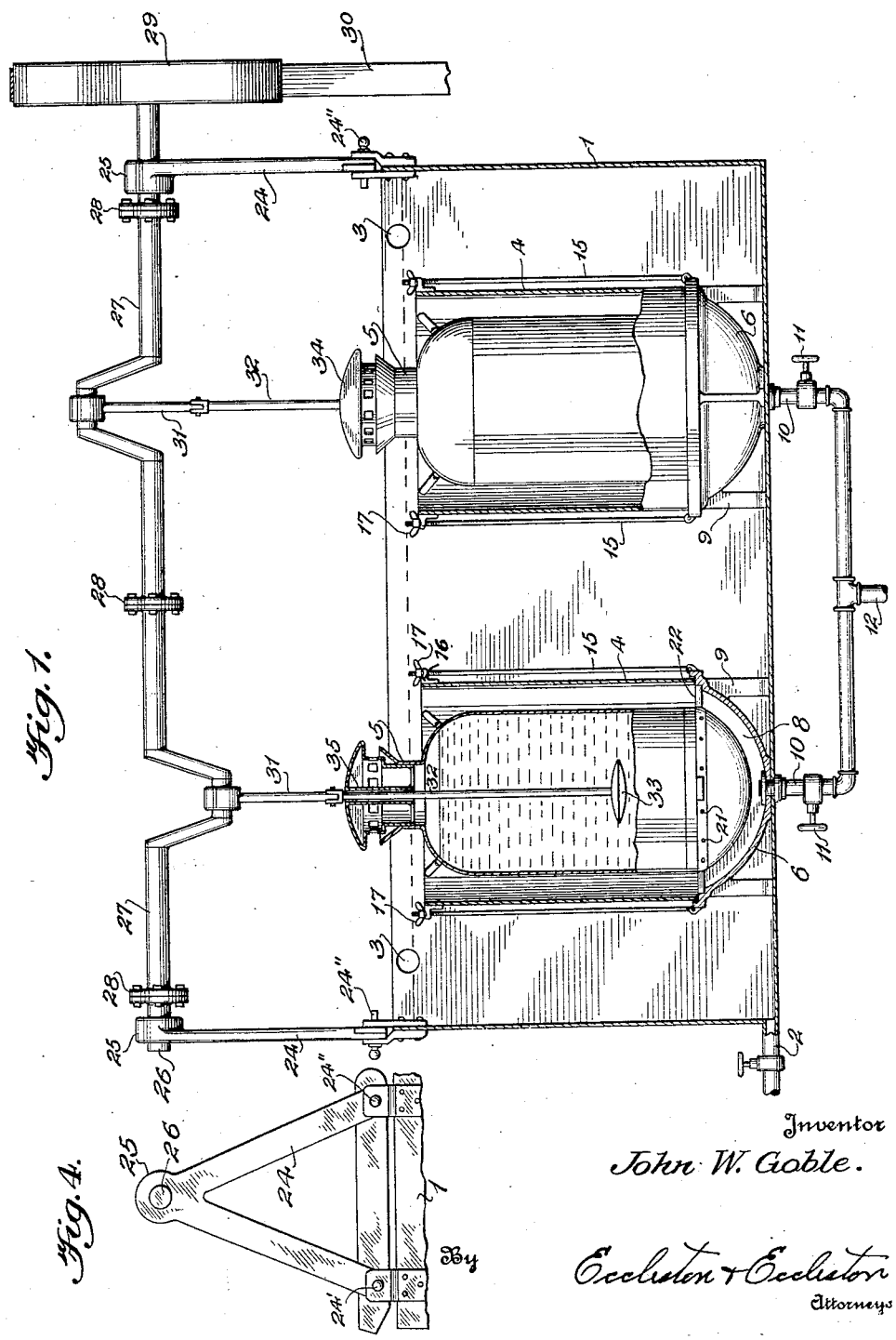
Figure 4 is a detail end view of the tank and one of the supporting brackets for the stirrer shaft.

Referring to the drawings in more detail the numeral 1 indicates a tank of any convenient size suitable for receiving one, two or more of the cooling units about to be described. The tank may be made of metal, concrete or the like and is provided with a drain pipe 2 for cleaning out the apparatus and with overflow pipes 3 for permitting a continuous passage of the cooling fluid.

Each of the cooling units is composed of a tubular or cylindrical member 4, double-walled if desired, and of a diameter substantially greater than the milk cans which are intended to be placed therein for cooling purposes. These members are supported upon individual water spreaders, which latter also form supports for receiving the cans of milk which are indicated herein by the numeral 5.

The water spreader comprises two substantially semi-spherical members 6 and 7 concentrically arranged to provide a substantially semi-spherical space 8 through which the cooling water is projected upwardly about the bottom and sides of the can 5 as will shortly appear. The member 6 is provided with legs 9 resting upon the bottom of the tank 1 and is centrally provided with an opening in which is secured a pipe 10 provided with hand valve 11.

These pipes 10 connect with the main water supply pipe 12 and by reason of the valves 11 it will be apparent that either one or all of the cooling units may be employed to suit the circumstances. The cylindrical member 4 rests within an annular seat 13 formed at the top of the member 6 and a gasket 14 is disposed between the seat and the lower edge of the member 4 to provide a water-tight seal. Bolts 15, four being shown, are pivoted to the member 6 and extend upwardly on the exterior of the tubular member 4 to a point above this member. The upper end of the tubular member 4 is provided with pairs of fingers 16 between which the upper ends of the bolts are adapted to be received, and clamping nuts 17 serve to securely clamp the elements 4 and 6 together against the interposed gasket 14.

The other element of the water spreader, namely, the member 7, is provided with a disk 18 on its concave side and inwardly of this disk is a second disk 19 spaced slightly therefrom. The disk 18 is provided with apertures or perforations 20 and the side wall of the member 7 between these disks is provided with a plurality of apertures or perforations 21. The member 7 is provided with a plurality of radially extending lugs 22 adapted to rest in seats 23 formed on the upper end of the inner wall of the member 6. This particular construction is clearly shown in Figures 2 and 3, and it will be noted that by this arrangement the water passing upwardly through pipe 10 will pass through the semi-spherical channel 8, part of it continuing upwardly around the sides of the milk can 5 and part of it passing through the annular series of apertures 21 and the apertures 20 so as to contact with the bottom of the can 5.

From the construction thus far described it will be seen that cans disposed within the tubular members 4 will be continually surrounded by a stream of cooling water which engages both the bottom and the sides of the cans, passes upwardly and overflows from the member 4 into the tank 1, and thence discharges through the overflow pipes 3. It will be apparent, therefore, that the cooling fluid is very effective in carrying away the heat of the milk, inasmuch as it contacts with all parts of the can and also with the exterior walls of the members 4 in which the cans are seated, thus materially lowering the temperature of the contents of the cans.

It is desirable, in order to expedite the cooling of the milk, that some means be employed to cause a circulation within the can, thereby causing all portions of the body of the milk to come into contact with the wall of the can which is being cooled. To this end the tank 1 is provided with a pair of brackets 24 secured to the ends of the tank as indicated at 24', and releasably secured in upright position by removable pins 24". These brackets are provided with bearings 25 on their upper ends for a shaft 26. This shaft in the present instance, includes two crank members 27 which are bolted together and to the bearing portions of the shaft by means of the bolted flanges 28. One end of the shaft 26 is provided with a pulley 29 to which a rotative movement is imparted by a belt 30. It is to be understood, however, that any desired mechanism for rotating the shaft 26 may be employed. Each of the crank members 27 is provided with a pitman 31 pivotally connected to which is a rod 32 extending into the interior of each milk can and provided on its lower end with an agitating member 33.

The cover 34 of each milk can is preferably provided with a tubular bearing member 35 extending centrally through the elongated cover portion which forms a slide bearing for the rods 32 and thus causes the agitator 33 to follow a rectilinear path in the can when operated by the crank 27.

It will be apparent, of course, that by reason of the separable crank sections 27 united by the bolted flanges 28 as heretofore described, any number of cranks may be employed, and hence the device as a whole may be increased to include any number of cooling units together with the agitating elements for causing a circulation of milk, it only being necessary in the event that a tank 1 is used it be large enough to receive the maximum number of cooling units which may become necessary.

From the foregoing description, taken in connection with the accompanying drawings, it will be observed that I have devised an exceedingly simple and inexpensive construction of cooling device which is adapted to receive milk cans of conventional shape and size; that a continuous flow of cooling fluid is caused to contact with all parts of the exterior wall of the can, while at the same time the milk is mechanically agitated to cause a circulation thereof; that one or more of the cooling units may be employed, and may be added to from time to time as necessary; and that the device is easily dismounted for cleaning purposes, repair, etc.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include within the scope of the appended claims.

What I claim is:

1. A milk cooler including a main tank, one or more cooling units mounted in the tank and each comprising an auxiliary tank adapted to receive a milk can in spaced relation to its walls, a water inlet connected with the bottom of the main tank and the auxiliary tank, and an overflow pipe connected to the upper end of the main tank.

2. A milk cooler including a tank, one or more cooling units mounted in the tank and each comprising a tubular member adapted to receive a milk can in spaced relation to its walls, a water spreader connected to the bottom of said tubular member, a water inlet connected to the water spreader, and an overflow pipe connected to the upper end of the tank.

3. A milk cooler including a tank, one or more cooling units mounted in the tank and each comprising a tubular member adapted to receive a milk can in spaced relation to its walls, a water spreader on which the tubular member is mounted, and means for clamping the tubular member and water spreader together.

4. A milk cooler including a tank, one or more cooling units mounted in the tank and each comprising a tubular member adapted to receive a milk can in spaced relation to its walls, a substantially semi-spherical water spreader on which the tubular member is mounted, and means for clamping the tubular member and water spreader together.

5. A milk cooler including a tank, one or more cooling units mounted in the tank and each comprising a tubular member adapted to receive a milk can in spaced relation to its walls, a water spreader on which the tubular member is mounted, a gasket between the water spreader and tubular member, and clamping bolts for securing said elements together.

6. A milk cooler including a tank, one or more cooling units mounted in the tank and each comprising a tubular member adapted to receive a milk can in spaced relation to its walls, a substantially semi-spherical water spreader provided with a channel adapted to direct water upwardly along the side walls of a milk can mounted in the tubular member and also provided with apertures to direct water against the under side of the milk can.

7. A milk cooler including a tank, one or more cooling units mounted in the tank and each comprising an auxiliary tank adapted to receive a milk can in spaced relation to its walls, a water inlet connected with the bottom of the main tank and the auxiliary tank, an overflow pipe connected to the upper end of the main tank, and means for causing a circulation of the milk in the can.

8. A water spreader for milk coolers comprising two substantially semi-spherical members spaced apart to provide a semi-spherical channel, an apertured disc formed on the inner of said semi-spherical members, and said last-named member provided with apertures whereby water may be transmitted from the channel through the apertures of the disc.

JOHN W. GOBLE.